(12) United States Patent
Campbell

(10) Patent No.: US 11,364,612 B1
(45) Date of Patent: Jun. 21, 2022

(54) MULTI-FUNCTIONAL CHAINSAW FIELD MAINTENANCE TOOL

(71) Applicant: James R. Campbell, Candor, NC (US)

(72) Inventor: James R. Campbell, Candor, NC (US)

(*) Notice: Subject to any disclaimer, the term of this patent is extended or adjusted under 35 U.S.C. 154(b) by 79 days.

(21) Appl. No.: 16/994,743

(22) Filed: Aug. 17, 2020

(51) Int. Cl.
| | | |
|---|---|---|
| *B25F 1/02* | (2006.01) | |
| *B23D 63/00* | (2006.01) | |
| *B25G 1/08* | (2006.01) | |
| *B25F 1/00* | (2006.01) | |
| *A45F 5/14* | (2006.01) | |
| *A45F 5/02* | (2006.01) | |
| *F16M 13/02* | (2006.01) | |
| *B23D 63/16* | (2006.01) | |

(52) U.S. Cl.
CPC .............. *B25F 1/02* (2013.01); *A45F 5/021* (2013.01); *A45F 5/14* (2013.01); *B23D 63/003* (2013.01); *B25F 1/006* (2013.01); *B25G 1/08* (2013.01); *F16M 13/02* (2013.01); *A45F 2200/0575* (2013.01); *B23D 63/16* (2013.01)

(58) Field of Classification Search
CPC ... B25F 1/02; B25F 1/00; B25F 1/006; B23D 63/003; B23D 63/16
USPC ........................................................ 81/180.1
See application file for complete search history.

(56) References Cited

U.S. PATENT DOCUMENTS

| | | | | |
|---|---|---|---|---|
| 170,934 A | * | 12/1875 | Broadbooks | B26B 1/04 7/119 |
| 215,282 A | * | 5/1879 | Nawadny | B26B 11/00 7/163 |
| 290,106 A | * | 12/1883 | Port | B25B 13/14 7/139 |
| 300,717 A | * | 6/1884 | Merrick | B25F 1/006 7/139 |
| 366,322 A | * | 7/1887 | Johnson | B25B 13/06 81/437 |
| 381,724 A | * | 4/1888 | Ribble | B25F 1/006 7/139 |
| 389,549 A | * | 9/1888 | Crosby | B25B 7/22 7/130 |

(Continued)

OTHER PUBLICATIONS

Amazon.com: Stihl 0000-881-0403—heavy duty stump vise. \. (Date First Available Mar. 29, 2013). Retrieved Dec. 17, 2021, from https://www.amazon.com/STIHL-0000-881-0403-Heavy-Duty-Stump/dp/B00GWRKPFA/ (Year: 2021).*

*Primary Examiner* — David B. Thomas
*Assistant Examiner* — Jonathan G Santiago Martinez
(74) *Attorney, Agent, or Firm* — Tuggle Duggins P.A.; Blake P. Hurt

(57) ABSTRACT

A multi-functional tool that is particularly useful for in-field service and maintenance of a chainsaw, the tool having a handle section and a head section, wherein the handle section includes a plurality of tubular openings adapted to receive a multiplicity of repair tools, such as a chain file, depth gauge, screwdriver, wrench tool, etc., without requiring the removal of all other tools. The head section includes a pair of spaced-apart spikes to allow the tool to be secured to a wooden structure, such as a tree stump and a clamp to secure the chainsaw while service or maintenance is performed. The multi-functional chainsaw field maintenance tool further includes a device to facilitate transport of the multi-functional tool, such as a belt clip, shoulder strap or magnetic attachment device.

18 Claims, 5 Drawing Sheets

(56) References Cited

U.S. PATENT DOCUMENTS

| | | | | |
|---|---|---|---|---|
| 436,073 | A * | 9/1890 | Clow et al. | B25B 13/16 81/169 |
| 476,841 | A * | 6/1892 | Tomey | B25B 13/16 81/159 |
| 480,801 | A * | 8/1892 | Belles | B25B 13/14 7/139 |
| 515,498 | A * | 2/1894 | Mork | B25F 1/00 7/142 |
| 646,086 | A * | 3/1900 | Viles | B25B 13/22 81/144 |
| 690,688 | A * | 1/1902 | Barnes | B25B 13/16 81/163 |
| 797,211 | A * | 8/1905 | McKinney et al. | B25F 1/00 7/142 |
| 803,007 | A * | 10/1905 | Miller | B25B 13/5058 81/102 |
| 805,793 | A * | 11/1905 | Hanlon | B25B 13/22 81/144 |
| 813,180 | A * | 2/1906 | Smith | B25B 13/22 81/141 |
| 854,891 | A * | 5/1907 | Huffman | B25F 1/04 7/168 |
| 930,973 | A * | 8/1909 | Kleffman | B25B 7/22 7/130 |
| 1,026,866 | A * | 5/1912 | Horton et al. | B27B 21/08 7/150 |
| 1,042,318 | A * | 10/1912 | Chamberlain | B25B 13/14 7/139 |
| 1,334,971 | A * | 3/1920 | Shore | B25B 5/10 269/3 |
| 1,402,311 | A * | 1/1922 | Nieradka | B25F 1/003 81/181 |
| 1,410,184 | A * | 3/1922 | Hunter | B25B 5/006 269/73 |
| 1,413,798 | A * | 4/1922 | Shinn | B25F 1/00 81/158 |
| 1,496,716 | A * | 6/1924 | Lundqvist | B25F 1/003 7/142 |
| 1,532,147 | A * | 4/1925 | Macpherson | B25F 1/006 7/117 |
| 1,542,307 | A * | 6/1925 | Kennedy | B25B 13/20 81/150 |
| 1,558,036 | A * | 10/1925 | Moffitt | B25F 1/003 7/142 |
| 1,572,898 | A * | 2/1926 | Martin | B25D 1/00 7/144 |
| 2,076,462 | A * | 4/1937 | Horechney | B25F 1/003 81/168 |
| 2,249,786 | A * | 7/1941 | Sacerdote | B25F 1/003 81/128 |
| 2,524,308 | A * | 10/1950 | Cneesh | B25B 7/04 81/164 |
| 2,555,421 | A * | 6/1951 | Ronan | B25F 1/00 60/481 |
| 2,735,462 | A * | 2/1956 | Olsen | B25B 5/101 269/100 |
| 2,807,292 | A * | 9/1957 | Gelinas | B27B 17/0025 30/383 |
| 2,896,481 | A * | 7/1959 | Hebbert | B23D 63/162 76/31 |
| 3,316,634 | A * | 5/1967 | Bliss | A45D 29/02 30/143 |
| 4,109,900 | A | 8/1978 | Vandecoevering | |
| 4,355,551 | A * | 10/1982 | Kolleas | B23D 63/162 76/78.1 |
| 4,657,234 | A | 4/1987 | Stout | |
| 4,907,778 | A | 3/1990 | Rockwell | |
| 4,953,248 | A * | 9/1990 | Trombetta | B25F 1/006 7/107 |
| 4,960,016 | A * | 10/1990 | Seals | B25F 1/02 81/177.4 |
| 5,033,140 | A * | 7/1991 | Chen | B25F 1/006 7/127 |
| 5,197,195 | A * | 3/1993 | Aikens | B25H 7/04 30/293 |
| 5,280,659 | A * | 1/1994 | Park | B25G 1/085 7/128 |
| 5,293,792 | A * | 3/1994 | Chiang | B23B 47/288 81/416 |
| 5,765,822 | A * | 6/1998 | Mead | B25B 5/006 269/100 |
| 5,845,354 | A * | 12/1998 | Long | B25D 1/04 7/139 |
| 6,006,385 | A * | 12/1999 | Kershaw | B25F 1/04 7/128 |
| 6,145,144 | A * | 11/2000 | Poehlmann | B25B 7/04 7/128 |
| 6,219,870 | B1 * | 4/2001 | Swinden | B25F 1/003 7/118 |
| 6,318,218 | B1 * | 11/2001 | Anderson | B25F 1/003 81/440 |
| 6,725,486 | B2 * | 4/2004 | Oka | B25B 7/02 7/125 |
| D520,829 | S * | 5/2006 | Albertson | D8/26 |
| 7,306,366 | B1 * | 12/2007 | Camenzind | G01G 19/54 374/141 |
| 7,334,502 | B1 * | 2/2008 | Durkee | B25B 7/22 7/127 |
| D588,885 | S * | 3/2009 | Barber | D8/105 |
| 9,050,711 | B1 * | 6/2015 | Mazzarella | B25F 1/003 |
| 9,307,898 | B2 * | 4/2016 | Stout | A61B 3/0008 |
| 10,449,690 | B1 | 10/2019 | Plante | |
| 10,974,380 | B1 * | 4/2021 | Diaz | B25B 15/007 |
| 2001/0010100 | A1 * | 8/2001 | Berg | B25F 1/04 7/128 |
| 2002/0083530 | A1 * | 7/2002 | Rivera | B26B 11/008 7/128 |
| 2005/0144730 | A1 * | 7/2005 | Barber | B25B 7/22 7/138 |
| 2006/0137489 | A1 | 6/2006 | Nishigaki | |
| 2007/0056168 | A1 | 3/2007 | McLaughlin | |
| 2008/0164400 | A1 | 7/2008 | Beechinor | |
| 2015/0113818 | A1 | 4/2015 | Sohlman et al. | |
| 2016/0136800 | A1 * | 5/2016 | King, Jr. | B25B 15/008 7/108 |
| 2017/0232537 | A1 | 8/2017 | Lynn | |
| 2017/0266742 | A1 * | 9/2017 | Hetrick, Sr. | B23D 63/003 |
| 2020/0171642 | A1 * | 6/2020 | Newman | B25F 1/04 |
| 2021/0122013 | A1 * | 4/2021 | Prescott | B25B 13/5033 |

* cited by examiner

MULTI-FUNCTIONAL CHAINSAW FIELD MAINTENANCE TOOL

FIELD OF THE INVENTION

The invention herein pertains to a forestry tool, and more particularly relates to a multi-functional tool for servicing a chainsaw in the field.

DESCRIPTION OF THE PRIOR ART AND OBJECTIVES OF THE INVENTION

Chainsaws are often used in remote locations and need to be serviced from time to time while in the field. For example, it is frequently necessary to adjust the tension of the chain on the chainsaw cutting bar, sharpening or replacing the chain, changing or removing the spark plug, or other routine service operations. Thus, it is beneficial for operators to carry the necessary tools to service the chainsaw in the field. Carrying a chainsaw along with variety of service tools over difficult terrain to remote locations is cumbersome and potentially dangerous. It also creates the possibility that a needed tool is forgotten or lost, adding additional frustration and inefficiency.

While performing needed service on a chainsaw, it is desirable to hold the chainsaw securely to avoid injury to the operator. Chainsaws are weight unbalanced and have an odd shape, which makes it difficult to secure the saw while performing the service or repair. To address this concern, U.S. Pat. No. 4,657,234 discloses a device that allows the chainsaw to be secured to a vehicle, tree trunk, limb or other structure. The device is essentially a rigid bar with a clamp at each end, one clamp adapted to attach to the chainsaw and the other clamp adapted to be attached to a structure such as a tree trunk, tree limb, vehicle, etc. U.S. Pat. No. 4,907,778 discloses a box-like carrying device that has a handle that converts to a ground stake, allowing the carrier to be secured to the ground to provide a service platform for the chainsaw. While adequately addressing some of the issues involved in chainsaw field maintenance, these devices present some difficulties. For example, they are often oddly shaped or bulky and thus difficult to transport, or require time-consuming or difficult set-up in field conditions.

There is thus a need for a simple, convenient service tool for use in providing field maintenance of a chainsaw. Accordingly, it is an objective of the present invention to provide a multi-functional chainsaw field maintenance tool.

Another objective of the present invention is to provide a multi-functional chainsaw field maintenance tool that is small and easy to transport.

Yet another objective of the present invention is to provide a multi-functional chainsaw field maintenance tool that can be used to secure a chainsaw in place during maintenance and repair.

Still another objective of the present invention is to provide a multi-functional chainsaw field maintenance tool that includes multiple repair tools in a single unitary device.

Various other objectives and advantages of the present invention will become apparent to those skilled in the art as a more detailed description is set forth below.

SUMMARY OF THE INVENTION

The aforesaid and other objectives are realized by providing in a preferred embodiment, a multi-functional chainsaw field maintenance tool comprising a frame having a handle section and a head section. The handle section includes a plurality of openings adapted to receive one or more chainsaw repair tools, such as a chain file, screwdriver, wrench tool, or the like. The multi-functional chainsaw field maintenance tool further includes a device to facilitate transport of the multi-functional tool, such as a belt clip, shoulder strap or magnetic attachment device. The head section of the tool includes spikes to allow the tool to be attached to a tree stump or other wooden object by embedding the spikes into the wooden object and further includes a clamp to permit attachment of the chainsaw.

DETAILED DESCRIPTION OF THE PREFERRED EMBODIMENT AND OPERATION OF THE INVENTION

Figure 1:
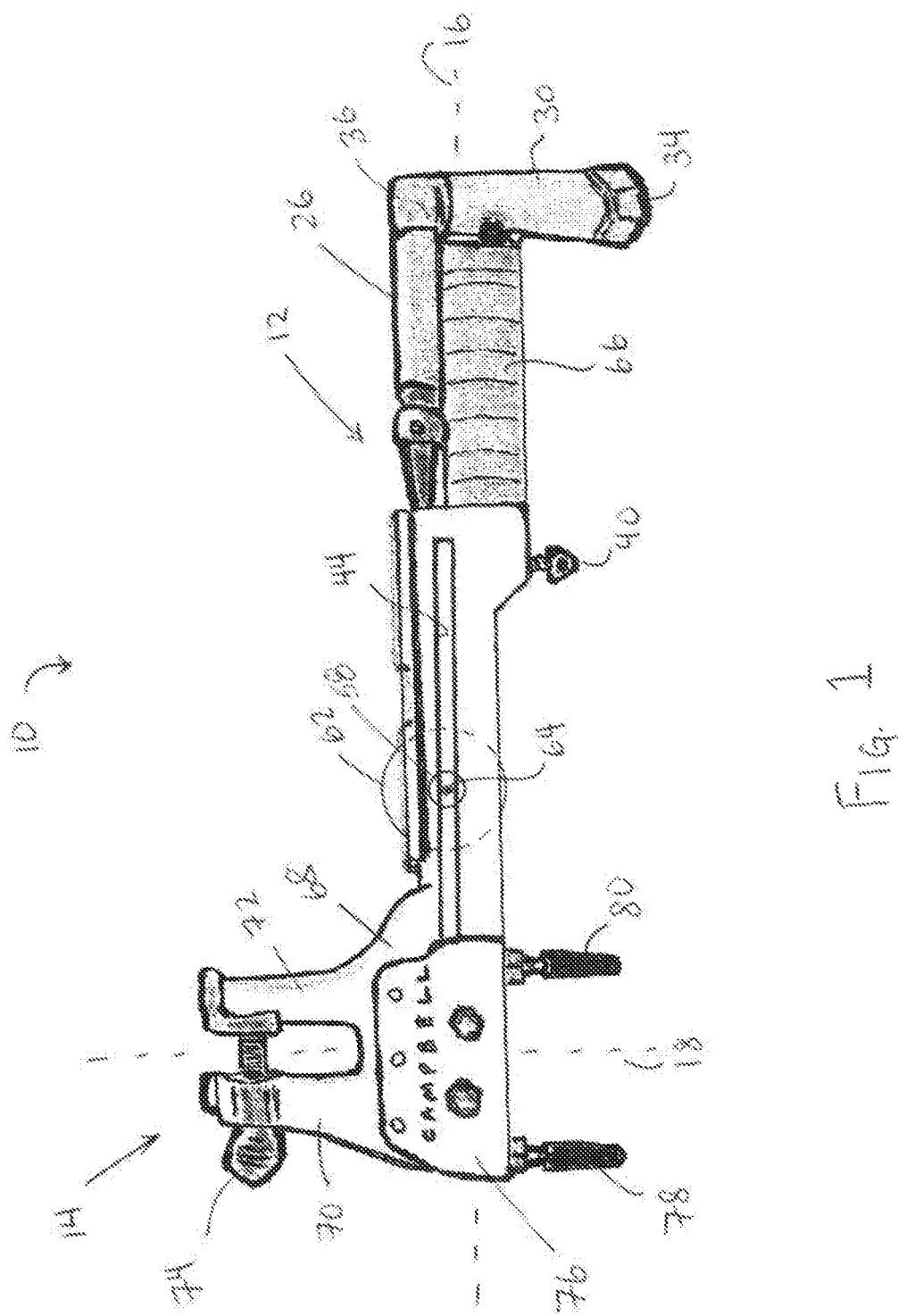
FIG. 1 is a perspective view, partly in phantom, of a preferred embodiment of the multi-functional chainsaw field maintenance tool.
Figure 2:
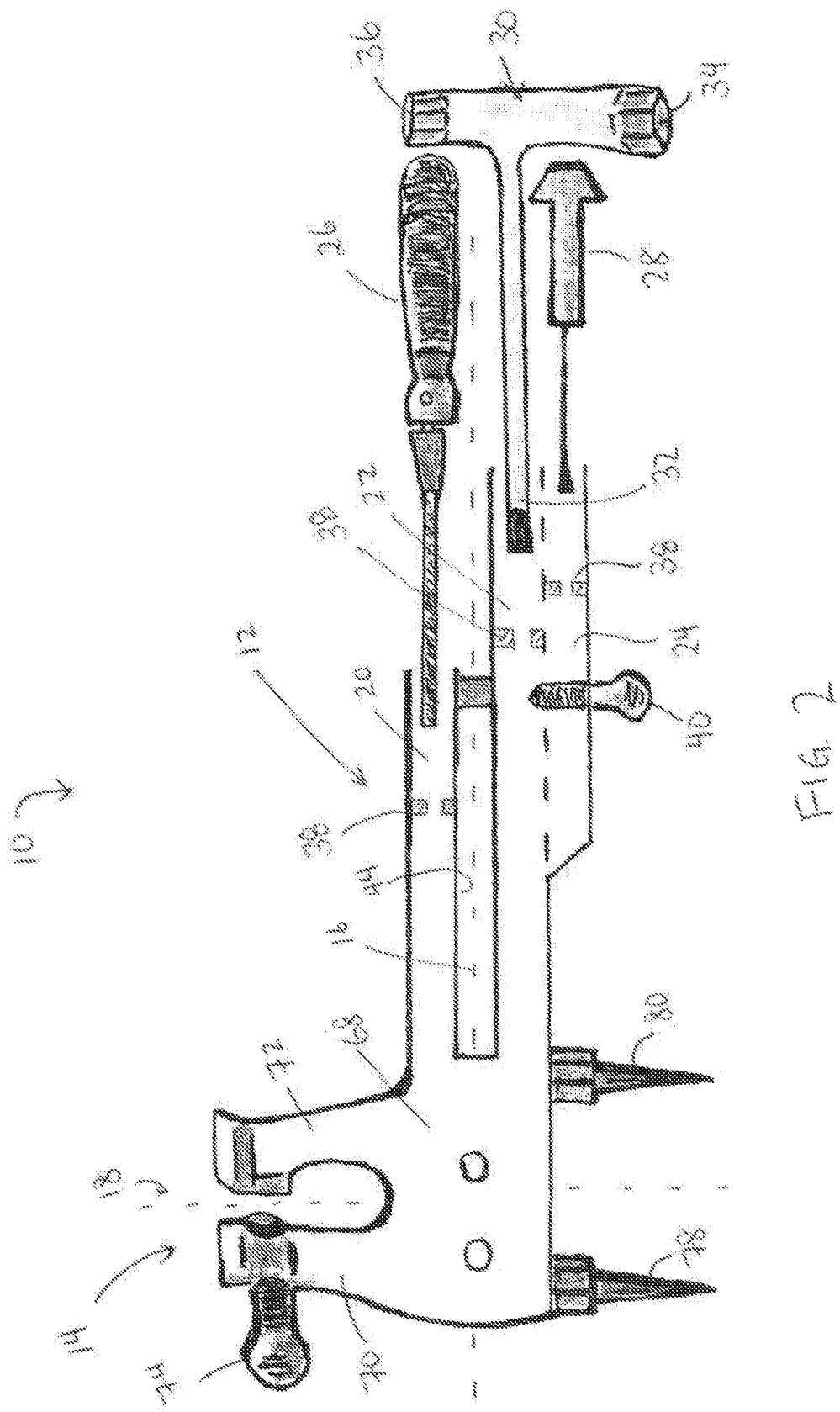
FIG. 2 is a schematic illustration of an exploded side elevation view, partly in section, of a preferred embodiment of the multi-functional chainsaw field maintenance tool, illustrating the storage of multiple service tools in the handle section.
Figure 3:
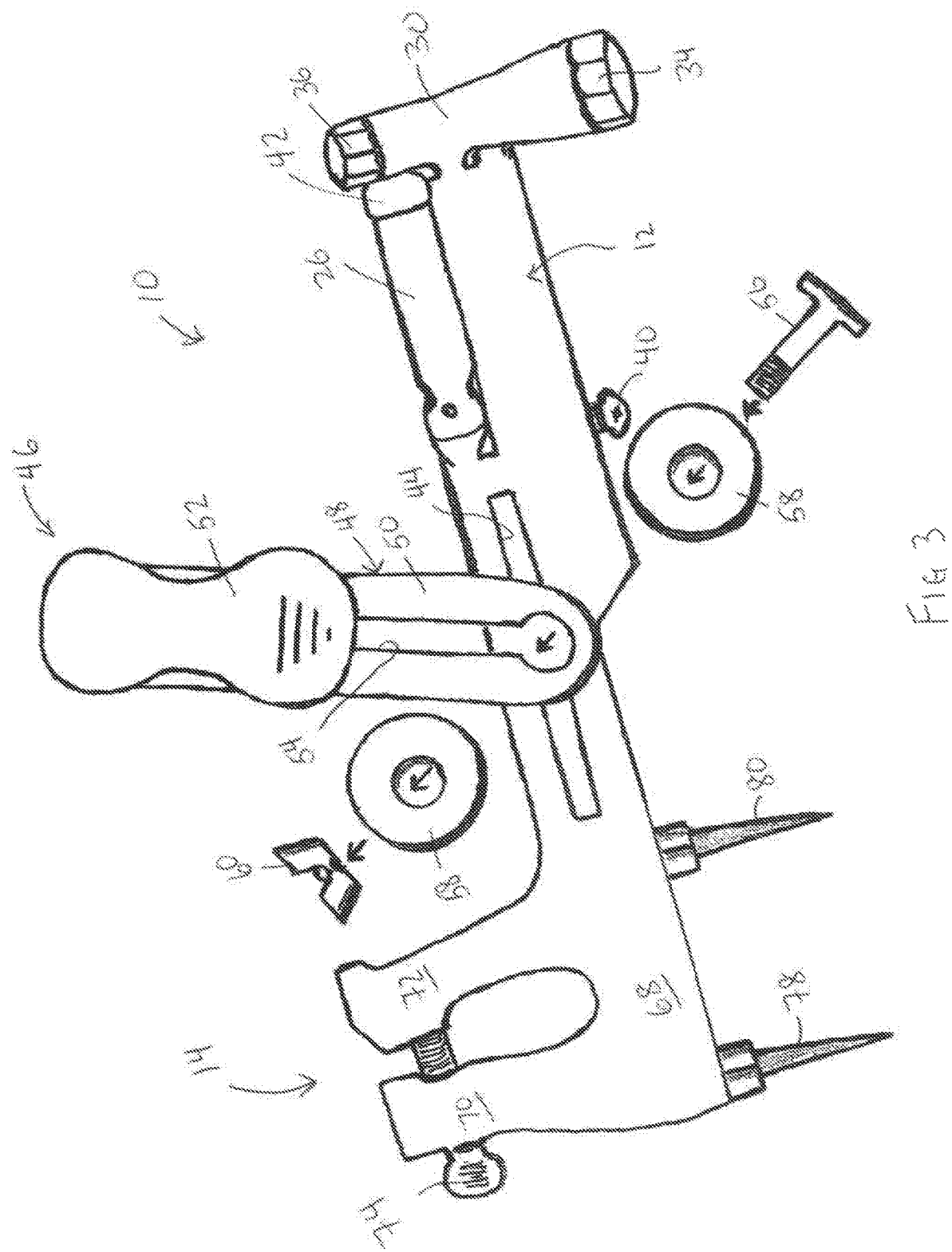
FIG. 3 is an exploded perspective view of an alternate embodiment of the multi-functional chainsaw field maintenance tool, illustrating an alternate embodiment of the head section and belt clip embodiment of the tool transportation device.

For a better understanding of the invention and its operation, turning now to the drawings, FIGS. 1-3, illustrate the preferred embodiments of the multi-functional chainsaw field maintenance tool 10 which may include a handle section 12 and a head section 14. The tool 10 preferably defines a horizontal axis 16 oriented parallel to the length of the handle section 12, and a vertical axis 18. Overall the tool 10 may resemble a hammer or hatchet in general appearance. The preferred embodiment(s) may include further features as described in further detail below, but it should be appreciated that the handle section 12 and head section 14 as described in further detail below are considered sufficient for the functionality of the instant invention.

Handle section 12, as best seen in FIG. 2, defines a plurality of openings 20, 22, 24 that are preferably cylindrical or tubular and oriented parallel to the longitudinal axis 16. The one or more tools typically utilized in the servicing or maintenance of a chainsaw are disposed within one or more of the respective tubular openings. In the preferred embodiment shown, a file 26 preferably used to sharpen the saw chain is disposed in tubular opening 20, a screwdriver 28 is shown disposed in tubular opening 24, and a combo service tool 30 is shown disposed in tubular opening 22. The combo tool 30 is preferably a "T" shaped device that may be included with the purchase of the chainsaw and includes a flat blade screwdriver 32, a large socket 34 configured (i.e. sized and shaped) to fit the spark plug and a small socket 36 configured (i.e. sized and shaped) to fit the nuts that secure the chainsaw cutting bar to the motor housing. Bushings 38 may be utilized to further secure the respective tools 26, 28, 30 in their respective tubular openings 20, 24, 22. Alternatively, the diameter and length of the tubular openings 20, 22, 24 may be sized to closely fit, and/or frictionally engage the tool housed therein. The use of appropriately sized bushings is preferred because it would allow for greater flexibility in the selection of tools carried within the tubular openings to fit a particular situation or operator preference.

With particular reference to FIGS. 1 and 3, it is particularly preferred that the combo tool 30, and specifically the end containing the sockets 34, 36, be oriented at the end of the handle section 12 remote from the head section 14. In this configuration, the socket(s) end of combo tool 30 helps to prevent the operator's hand from slipping off the end of the handle section 12, and also serves to secure the file 26 and screwdriver 28 between the socket end and the handle section 12. In this arrangement, all three of the tools housed within the tubular openings can be secured by a single thumb screw or set screw 40 that engages the screwdriver 34 of the combo tool. If needed, spacers 42 (FIG. 3) may be used to assure that the socket end of the combo tool 30 is in close contact with the other on-board tools.

The handle section 12 may be provided with a slot 44 oriented parallel to the horizontal axis 16 (see FIGS. 1 and 2). In the embodiment shown, the slot 44 is disposed between tubular opening 20 and tubular opening 22. Other locations may also be suitable. The slot 44 is particularly useful for securing a transport device to the multi-functional tool 10. Stated further, slot 44 preferably facilitates different position(s) in which the transport tools can be configured so as to adapt to numerous applications when transporting or, attaching a different tool or tool holding device as well as multiple transporting tools to be placed in the provided slot together. Slot 44 also provides any of the transporting tools or holding devices to be placed on either side of the tool 10 and slid or adjusted or spaced inward or outward with spacers, as stated, to the desired position for optimal fit and balance of tool 10 when using or transporting the same. With reference to FIG. 3, a first embodiment of the tool transportation device is a belt clip 46. The belt clip 46 has a body 48 comprising a flat portion 50 and a hook portion 52. The flat portion 50 has a slot 54 used to connect the body 48 to the handle section 12 of multi-functional tool 10. While a simple bore hole could be used in lieu of slot 54, the latter is preferred because it allows for sliding (longitudinal and/or lateral displacement) as well as rotational movement of the belt clip 46 relative to the multi-functional tool 10. The belt clip 46 may be affixed to the handle section 12 of multi-functional tool 10 by a conventional fastener, such as a bolt 56 with corresponding washers 58, 58 and wing nut 60. It will be understood by those skilled in the art that the belt clip could readily be attached to other locations on the multi-functional tool. While the belt clip 46 may obviously be used to support the multi-functional tool from an operator's belt, it may also be clipped to the cutting bar on the chainsaw and transported with the chainsaw, for example with a frictional engagement, or a magnetic device. It should be understood that belt clip 46 may clip anywhere a conventional belt clip could be attached, given it is a suitable place that would safely support tool 10 for transport or storage. Also the provided slot defined in belt clip 46 allows for extra travel past slot 44 which allows more optimal space in slot 44 for transporting adaptors or tool holders to be attached at the same time. This slot in clip 46, combined with the slot 44, with or without the provided spacers as described above, allow tool 10 to be transported or stored vertically or horizontally or rotated in numerous different positions between the two, for height as well as distance of the tool, thus allowing the tool to be adapted to numerous places. In one embodiment, the exterior surface of handle section 12 that defines tube 20 is configured as a chainsaw depth gauge, and in the preferred embodiment includes a chainsaw depth gauge file as well (see FIG. 1, file shown in FIG. 2). The depth gauge setting decreases whenever the saw tooth gets sharpened. This is due to the fact that a saw tooth becomes shorter through the filing process and also flatter because of its shape (growing narrower and flatter towards the back). Therefore users need to inspect and, if necessary, adjust the depth gauge setting every time they sharpen the saw chain to get a good cut. In alternate embodiment, the depth gauge is attached to the exterior surface of handle section 12 with one or more magnetic members (not shown). Further, or in the alternative, file depth gauge may be secured in its place on top of tube 20 by the rake (also known as the drag link file) that is positioned on top of the depth gauge and is secured in its position in the provided space between the individual side plates and base section 68 and secured with the provided locking thumbscrew.

With reference to FIG. 1, an alternate embodiment of a tool transportation device is show, namely a magnet 62. The magnet 62, shown partially in phantom in FIG. 1, can be secured to the handle section 12 of the multi-functional tool 10 by a bolt 64 and washer 58. The magnet 62 allows the multi-functional tool 10 to be attached to metal components on the chainsaw, such as the cutting bar, for easy transport.

While not illustrated in the Figures, it will be understood that the multi-functional tool may also be carried hands free by attaching a strap or cordage to the multi-functional tool for shoulder or cross-body carry. Handle section 12 may be wrapped with a suitable material for increasing the modulus of adhesion to the hand of a user, or defining an absorbent quality to prevent moisture build-up thereon, such as tape 66 (see FIG. 1) for added comfort and grip. Suitable materials for use as tape 66 include materials used to wrap handles on tennis rackets, golf clubs and other sports equipment, for example, but other materials such as rubberized bike handle may also suffice.

The head section 14 of multi-functional tool 10 has a base portion 68 where the head is affixed to the handle section. Base portion 68 has a pair of spaced-apart, upstanding support members 70, 72 oriented parallel to the vertical axis 18. A thumb screw 74 is in threaded engagement with support member 70 and traverses the opening between support member 70 and support member 72. In this arrangement, an object, such as the chain bar on a chainsaw, may be clamped between the support members 70, 72.

Figure 4:
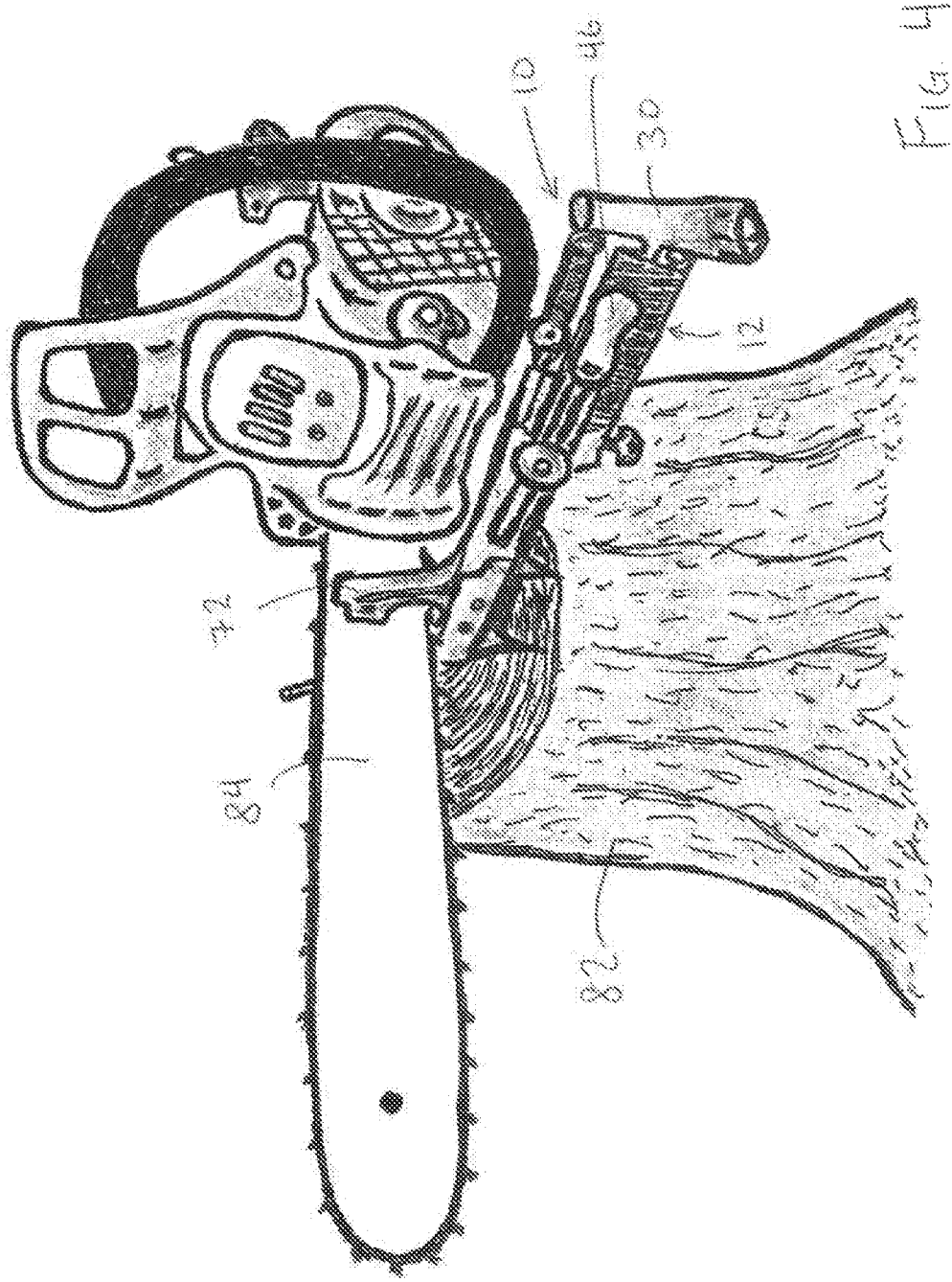
FIG. 4 is a perspective view of the preferred embodiment of the multi-functional chainsaw maintenance tool shown affixed to a tree stump and with a chainsaw secured thereto for service or maintenance.
Figure 5:
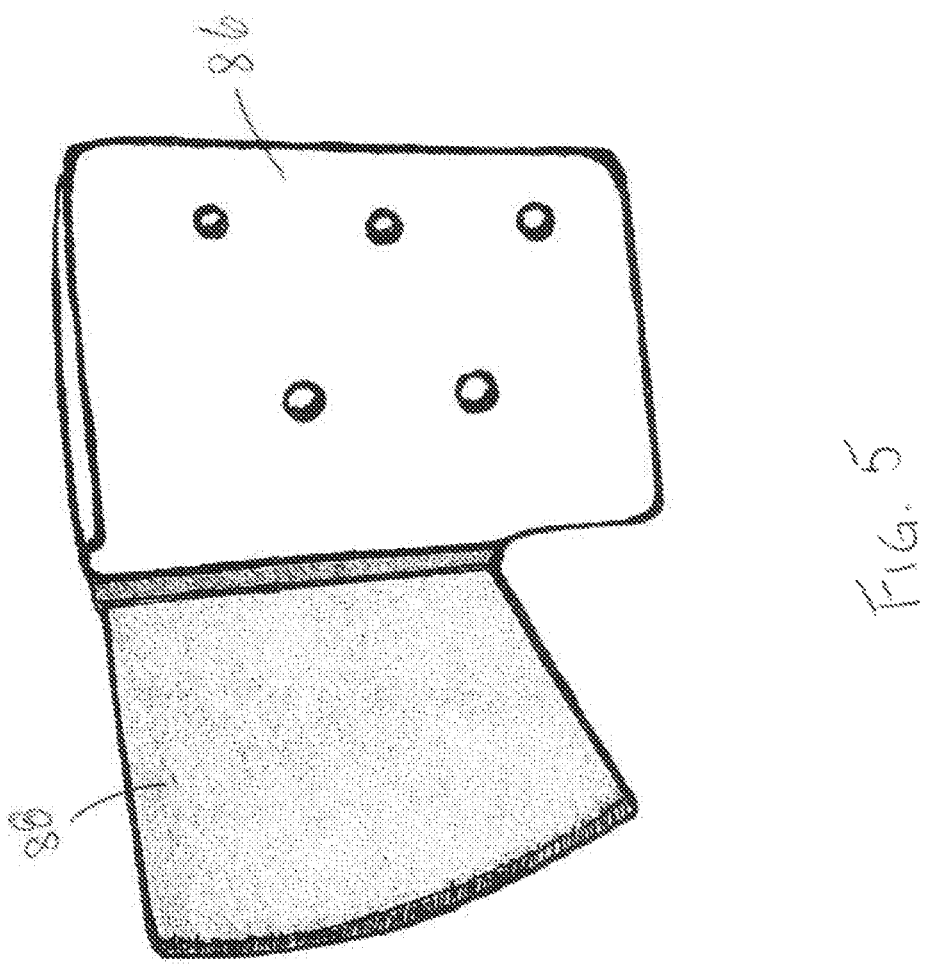
FIG. 5 is a perspective view of an alternate embodiment of an attachment for the head section of the multi-functional tool.

A saddle member 76, which is "U" shaped in cross-section, is affixed to base portion 68 and contains two downwardly projecting spikes 78, 80 oriented parallel to the vertical axis 18 and in the opposite direction from support members 70, 72. By swinging the multi-functional tool 10 like a hammer or hatchet, the operator can drive the spikes 78, 80 into a wooden object (after removing spike covers as shown in FIG. 1), such as a tree stump 82 as shown in FIG. 4. Once the multi-functional tool 10 is secured to the stump 82, the chain bar 84 can be placed between the support members 70, 72 (support 70 not shown in FIG. 4) and the thumb screw tightened to secure the saw while the necessary service or maintenance is being performed. Further, it may be removed is by a firm bump on the top of the tool 10 grip handle. Saddle member 76 and spikes 78, 80 may be formed as an integral member with the head section 14 of the multi-functional tool or the spikes 78, 80 may be attached directly to the base portion 68 of head section 14, as shown in FIG. 2. While such an embodiment is contemplated by the present disclosure, it is not particularly preferred. In particular, the spikes 78, 80 may become dulled or damaged during use. By making the spikes and/or saddle member as separate members, they can be removed and replaced easily without having to replace the entire multi-functional tool. Furthermore, by making the saddle member 76 a separate piece, one can provide additional utility and functionality. For example, the entire saddle member 76 may be removed and replaced with an alternate saddle member containing spikes of different size or configuration, or by a saddle member, such as saddle 86 shown in FIG. 5, having a blade 88. Attaching such a saddle 86 provides additional functionality and allows the multi-functional tool 10 to be used as a hatchet. Saddle 76 and/or saddle 86 may further include the two attachment bolt holes or the three threaded holes on each side of the respective saddle plates (not shown), which may provide threaded thumbscrews be used in any of the three different said threaded holes, that secure(s) a file or other tools that may fit in the space provided between the base portion 68 and the upstanding support members 70 and 72, on either side of the tool when the blade portion is in use. Spikes and/or saddle member(s) 76, 86 are preferably separate also due to allowing one or more plates of the respective saddles to be spaced with spacers between the support members 70 and 72 and the individual side plates that are attached between the base portion 68 and the lower handle tube with provided two nuts and bolts, so as to accept a wider tool in the provided space and secured with a thumbscrew.

The multi-functional tool 10 may be formed of any suitable material, taking into account its intended use. Durable materials that are capable of withstanding the stresses imposed in driving the spikes into a stump, or using the tool as a hatchet, such as ferrous and non-ferrous metals or reinforced composites, are preferred. Given the intended environment for use of the multi-functional tool 10, it is advantageous for the tool to be easily found if placed on the ground. Thus, bright color and/or reflective markings are preferred.

In the drawings and specification there has been set forth a preferred embodiment of the invention, and although specific terms have been employed, they are used in a broad and descriptive sense only and are not intended to limit the scope of the appended claims. Modifications and alternatives may suggest themselves to those skilled in the art upon reading the foregoing disclosure. For example, while the embodiments illustrate a handle section 12 having three tubular openings, it will be apparent that one could fabricate the handle section to house additional tools that might be needed for the particular operation or operator preference. Similarly, in the illustrated embodiment the tools carried within the handle section 12 are maintained within the housing by a single set screw. If desired, each tool may be maintained in place by its own set screw, which may be advantageous depending on the tools carried within the handle section. In addition, it is understood that the tubular openings 20, 22, 24 are contemplated as having a circular cross-section, but this is not necessary. So long as the opening is large enough to accommodate the intended tool, the shape is irrelevant.

I claim:

1. A multi-functional tool comprising a handle section and a head section, wherein the head section comprises a clamp and a U-shaped saddle, the clamp including a pair of spaced-apart upstanding supports oriented parallel to a vertical axis of the multi-functional tool, and a clamping screw in threaded engagement with one of the upstanding supports, the clamping screw oriented perpendicular to the vertical axis of the multi-functional tool, whereby an article can be clamped between the upstanding supports; the U-shaped saddle further comprising a pair of spaced-apart spikes that can be driven into a wooden structure, the pair of spikes oriented parallel to the vertical axis of the multi-functional tool.

2. The multi-functional tool of claim 1, wherein the handle section comprises a plurality of openings sized to receive repair tools therein, and wherein the openings are oriented parallel to a horizontal axis of the multi-functional tool.

3. The multi-functional tool of claim 1, further comprising repair tools selected from a sharpening file, cutting depth gauge, screwdriver, and combo tool.

4. The multi-functional tool of claim 2, comprising repair tools selected from a sharpening file, cutting depth gauge, screwdriver, and combo tool; and wherein the repair tools are secured in respective openings by a single fastener.

5. The multi-functional tool of claim 2, comprising repair tools selected from a sharpening file, cutting depth gauge, screwdriver, and combo tool; wherein the repair tools are held in respective openings by a single fastener; and wherein the single fastener comprises a thumb screw.

6. The multi-functional tool of claim 1, wherein the handle section further comprises a cushioned grip surface.

7. The multi-functional tool of claim 1, wherein the head section further comprises a pair of spaced-apart spikes that can be driven into a wooden structure, the pair of spikes oriented parallel to a vertical axis of the multi-functional tool; and wherein the pair of spikes are replaceable.

8. The multi-functional tool of claim 1, wherein the U-shaped saddle is removable from the head section.

9. The multi-functional tool of claim 1, further comprising a belt clip removably attached to the handle section.

10. The multi-functional tool of claim 1, further comprising a belt clip removably attached to the handle section; the belt clip comprising a flat portion and a hook portion; the flat portion having a slot; the handle section having a slot; and a fastener disposed within the slot in the handle section and the slot in the flat portion, whereby the belt clip can be slid and pivoted relative to the handle.

11. The multi-functional tool of claim 1, further comprising a magnet removably attached to the handle section to enable the multi-functional tool to be attached to a metal object.

12. A multi-functional tool comprising a handle section and a head section, wherein the head section comprises a clamp and a U-shaped saddle, the clamp including a pair of spaced-apart upstanding supports oriented parallel to a vertical axis of the multi-functional tool, and a clamping screw in threaded engagement with one of the upstanding supports, the clamping screw oriented perpendicular to the vertical axis of the multi-functional tool, whereby an article can be clamped between the upstanding supports; the U-shaped saddle further including a blade to enable the multi-functional tool to be used as a hatchet.

13. The multi-functional tool of claim 12, wherein the handle section comprises a plurality of openings sized to receive repair tools therein, and wherein the openings are oriented parallel to a horizontal axis of the multi-functional tool.

14. The multi-functional tool of claim 13, further comprising repair tools selected from a sharpening file, cutting depth gauge, screwdriver, and combo tool.

15. The multi-functional tool of claim 13, comprising repair tools selected from a sharpening file, cutting depth gauge, screwdriver, and combo tool; and wherein the repair tools are secured in respective openings by a single fastener.

16. The multi-functional tool of claim 13, comprising repair tools selected from a sharpening file, cutting depth gauge, screwdriver, and combo tool; wherein the repair tools are held in respective openings by a single fastener; and wherein the single fastener comprises a thumb screw.

17. The multi-functional tool of claim 12, wherein the handle section further comprises a cushioned grip surface.

18. The multi-functional tool of claim 12, wherein the head section further comprises a U-shaped saddle removably secured to the head section.

* * * * *